United States Patent [19]

Burgei

[11] Patent Number: 4,864,886
[45] Date of Patent: Sep. 12, 1989

[54] CONSOLE INTEGRATED PULL TO RELEASE PARKING BRAKE ACTUATOR

[75] Inventor: Russell J. Burgei, Jackson, Mich.

[73] Assignee: ITT Corporation, New York, N.Y.

[21] Appl. No.: 46,271

[22] Filed: May 5, 1987

[51] Int. Cl.$^4$ .............................................. G05G 5/06
[52] U.S. Cl. ........................................ 74/536; 74/535; 180/315; 180/328
[58] Field of Search ................ 74/535, 536, 512, 513, 74/501.5 R, 501.6; 180/315, 321, 325; 312/235 R

[56] References Cited

U.S. PATENT DOCUMENTS

| | | | |
|---|---|---|---|
| 2,985,032 | 5/1961 | Schroeder et al. | 74/536 |
| 3,302,482 | 2/1967 | Szajner et al. | 74/535 |
| 3,375,731 | 4/1968 | LaCroix | 74/536 |
| 3,580,104 | 5/1971 | Yashiro | 74/535 |
| 4,127,042 | 11/1978 | Lipshield | 74/535 |
| 4,193,320 | 3/1980 | Oota | 74/535 |
| 4,278,143 | 7/1981 | Nagai | 74/535 |
| 4,299,166 | 4/1980 | Hansen | 74/523 |
| 4,548,093 | 10/1985 | Nomura et al. | 180/315 |
| 4,567,786 | 2/1986 | Sakurai | 74/491 |
| 4,690,241 | 9/1987 | Miyadera | 180/315 |

FOREIGN PATENT DOCUMENTS

| | | | |
|---|---|---|---|
| 712306 | 9/1941 | Fed. Rep. of Germany | 74/536 |
| 2431321 | 1/1976 | Fed. Rep. of Germany | 180/315 |
| 1255059 | 1/1961 | France | 74/535 |
| 405108 | 2/1934 | United Kingdom | 74/536 |

Primary Examiner—Vinh Luong
Attorney, Agent, or Firm—Robert P. Seitter

[57] ABSTRACT

A hand-operated brake actuator defining an integral portion of a console for an automobile seating arrangement. The actuator includes a primary lever arm (32) which defines a portion of the frame of the console and carries a compartment access cover. The primary lever arm is mounted for independent pivotable movement with respect to a secondary lever arm. The primary lever arm pivots the secondary lever arm which is retained in an engaged position to hold a brake cable in tension by a pull-to-release pawl mechanism. In the engaged position of the actuator, the primary lever arm is independently returnable to the stored position. A stationary ratchet sector member and a pawl are mounted on the secondary lever. The pawl ratchets over the ratchet sector and holds the secondary lever in the engaged position. A brake cable is attached to the secondary lever and is thereby held in tension. The pawl is releasable from the sector upon reapplication of a force on the secondary lever applied toward the engaged position. The disengagement force is effected by pivoting the primary lever back toward the engaged position from the stored position so as to recontact and move the secondary lever. A pawl, which is spring-loaded, pivots out of engagement from the sector and thereby releases the secondary lever and brake cable.

4 Claims, 5 Drawing Sheets

CONSOLE INTEGRATED PULL TO RELEASE PARKING BRAKE ACTUATOR

BACKGROUND OF THE INVENTION

This invention relates to hand-operated parking brake actuators. More particularly, the invention relates to a pull-to-release brake actuator, wherein the actuating handle is returnable to a stored position with the brake applied.

Hand-operated parking brake actuators for automotive applications are of two principal types. The first includes a non-retractable hand-operated lever which is pulled from a released position to an engaged position. This type of actuator typically includes a stationary ratchet sector gear and a pawl which moves with the lever arm and engages the sector gear to hold the lever arm in an engaged position. A brake cable attached to the lever arm is appropriately held in tension. To release this type of actuator, typically a disengagement member operated by the operator physically pushes or pulls the pawl from engagement with the sector gear teeth.

Another type of non-retractable actuator is disclosed in U.S. Pat. No. 3,580,104. That actuator incorporates a stationary ratchet sector and pawl mounted on a hand-operated lever. The pawl in this device is adapted to hold the lever and brake cable in the applied position and to automatically release from engagement with the sector upon reapplication of a force on the lever in the direction of engagement to allow the lever to return to the released position. This type of release mechanism is known as a pull-to-release since activation of an auxiliary release member is not required, but rather, the operator only needs to pull the lever slightly past the engaged position to release the pawl from engagement with the sector. It should be noted, however, that in both type of actuators just described, the actuating lever is non-retractable and remains in the engaged position with the brake applied.

The second principal type of hand-operated brake actuator is known as the retractable-type. In this type of actuator, the actuating lever arm is returnable to the stored or released position with the brake remaining applied. These actuators typically include a pivoting ratchet sector operated by the lever arm which is engaged by a stationary pawl. The brake cable is affixed to the pivoting sector and is held in the engaged position by the pawl. Since the lever arm is separate from the sector it is returnable to the released position with the sector and cable held in engaged position by the pawl. Release of this type of actuator is also achieved by operating an auxiliary disengagement member which engages and physically moves the pawl out of engagement from the sector. Heretofore, the pull-to-release feature such as that applied to non-retractable actuators, has not been applied to the retractable type brake actuator.

SUMMARY OF THE INVENTION

The object of the present invention is to provide for a hand-operated brake actuator which retracts to a stored position with the brake applied and which requires no external auxiliary members to disengage the actuator, but rather incorporates a pull-to-release mechanism.

The invention provides for a two-part operating lever arrangement. The first, primary lever, is hand engageable and is pivotably mounted for engaging and pivoting an independently pivotably mounted secondary lever. Advantageously, the independent pivotable mounting of the primary operating lever provides for return of the primary lever to a stored position with the brake applied.

According to an important feature of the invention, the primary lever is incorporated into the frame structure of a console of an automobile seating arrangement.

According to another important feature of the invention, the frame portion of the console defined by the operating lever surrounds an opening into a compartment of the console and an access cover is pivotably mounted to the operating lever over the access opening.

According to another important feature of the invention, there is provided a stationary ratchet sector member and a pawl mounted on the secondary lever. The pawl ratchets over the ratchet sector and holds the secondary lever in the engaged position. A brake cable is attached to the secondary lever and is thereby held in tension.

Another important feature of the invention provides for the pawl to be releasable from the sector upon reapplication of a force on the secondary lever applied toward the engaged position. The disengagement force is effected by pivoting the primary lever back toward the engaged position from the stored position so as to recontact and move the secondary lever. A pawl, which is spring-loaded, pivots out of engagement from the sector and thereby releases the secondary lever and brake cable.

BRIEF DESCRIPTION OF THE DRAWINGS

The invention will be better understood after a reading of the following Detailed Description Of The Preferred Embodiment in conjunction with the drawings in which:

FIG. 7 is a partial cross-sectional view taken along the line 7—7 of FIG. 2 showing futher details of construction of the pull-to-release mechanism;

DETAILED DESCRIPTION OF THE PREFERRED EMBODIMENT

Figure 1:
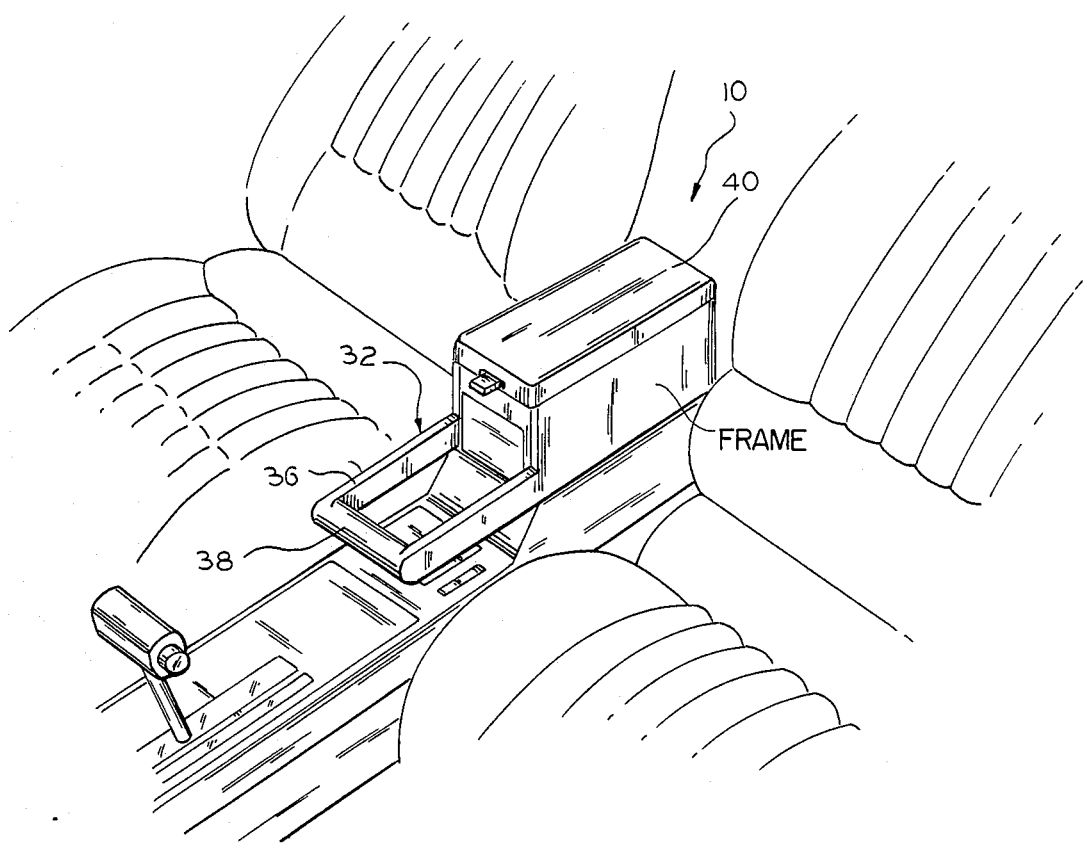
FIG. 1 is a pictorial view of a console for use in an automobile seating arrangement including the brake actuator according to the invention.

Shown in FIG. 1 is a pictorial of a console 10 for an automobile seating arrangement of the type including an internal compartment. It is to be appreciated that other console arrangements can be utilized with the brake actuator according to the invention. The invention is described, however, as integrated into the console of a vehicle wherein the actuating lever, described in detail below, is an integral part of the frame of the console compartment.

Figure 2:
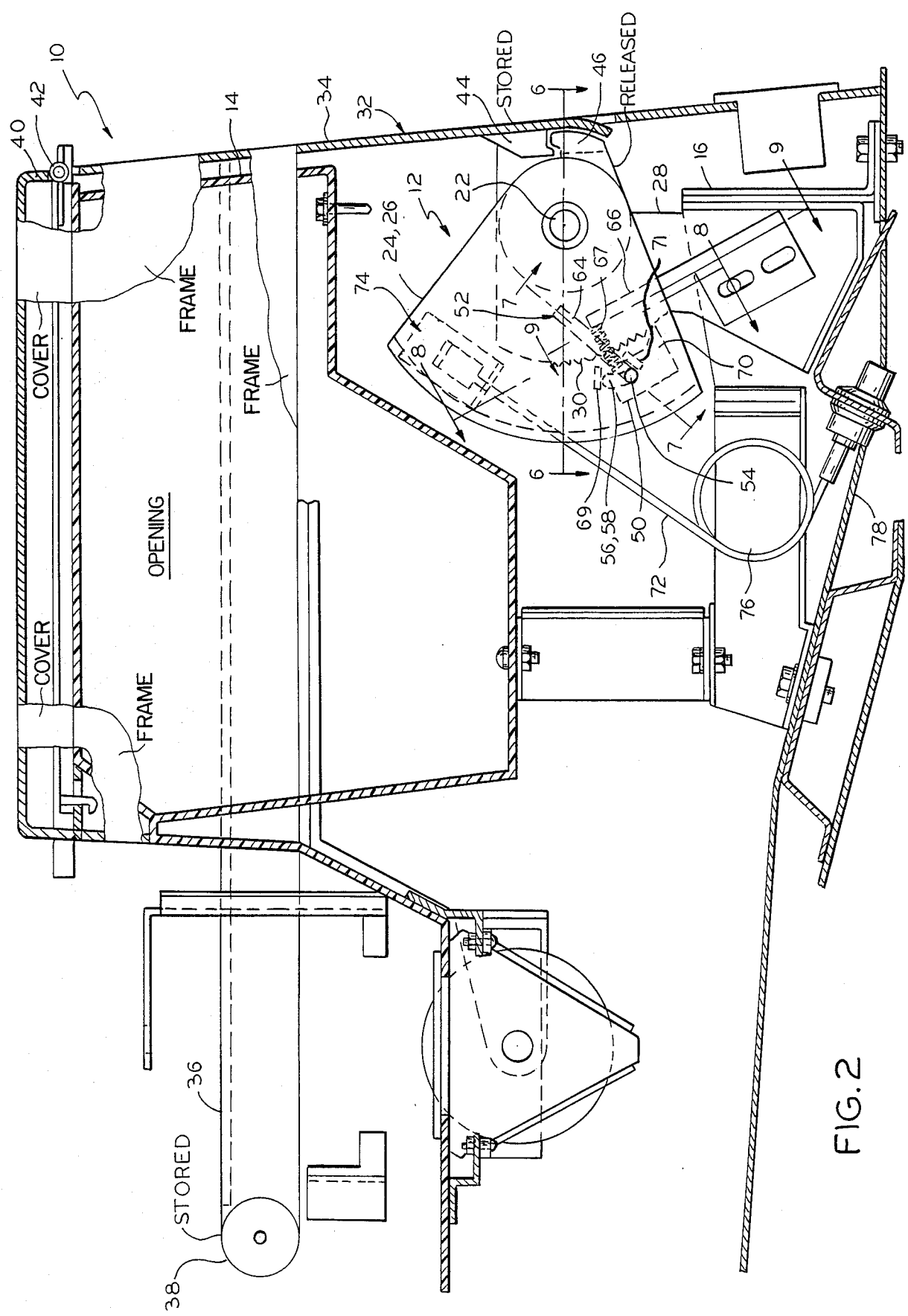
FIG. 2 is a vertical cross-sectional view of the console of FIG. 1 with the operating lever in the stored position and the brake cable released showing details of construction and operation.
Figure 3:
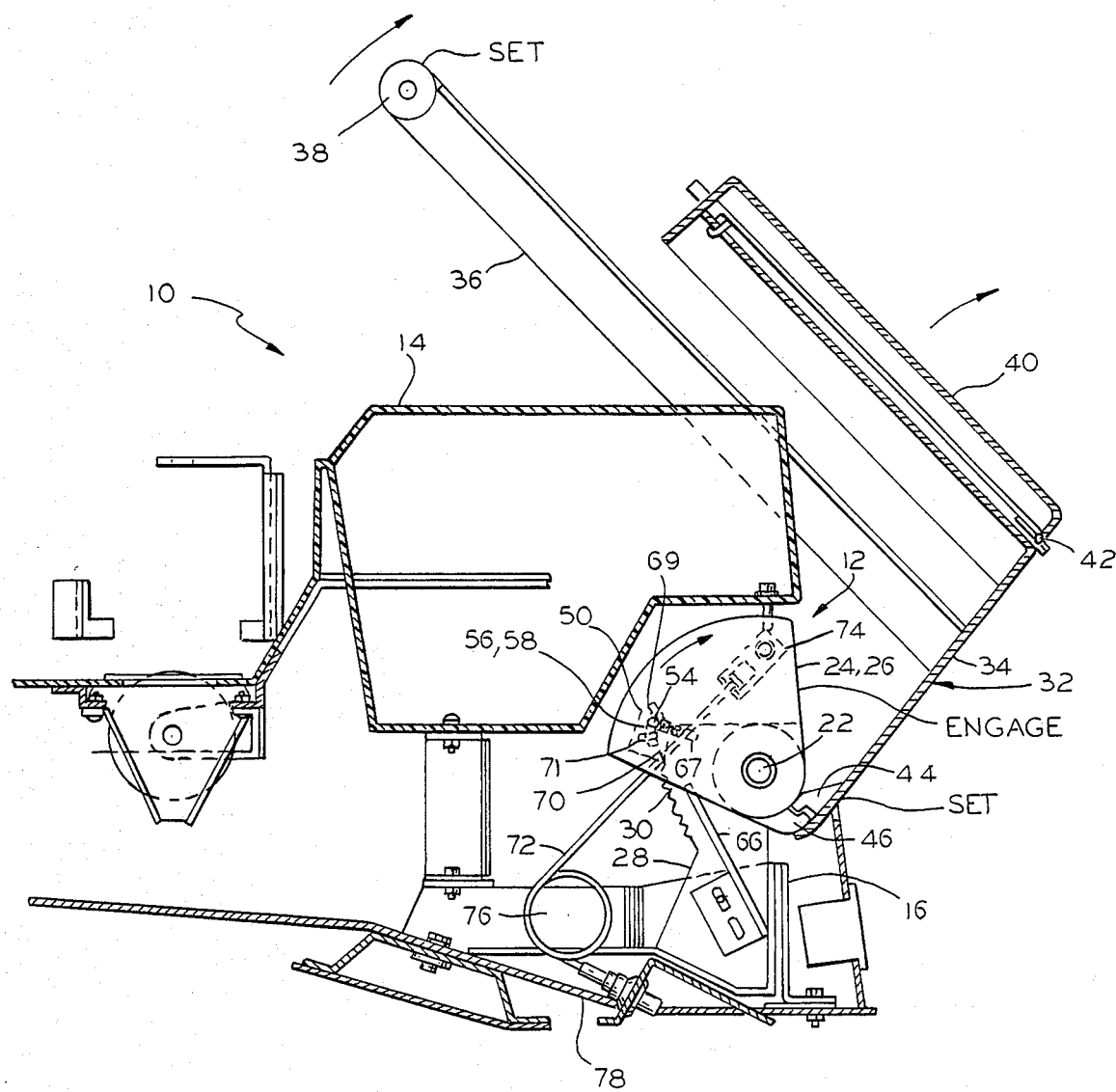
FIG. 3 is a vertical cross-sectional view of the console of FIG. 1 with the operating lever in the set position and the pawl engaged showing details of construction and operation.
Figure 6:
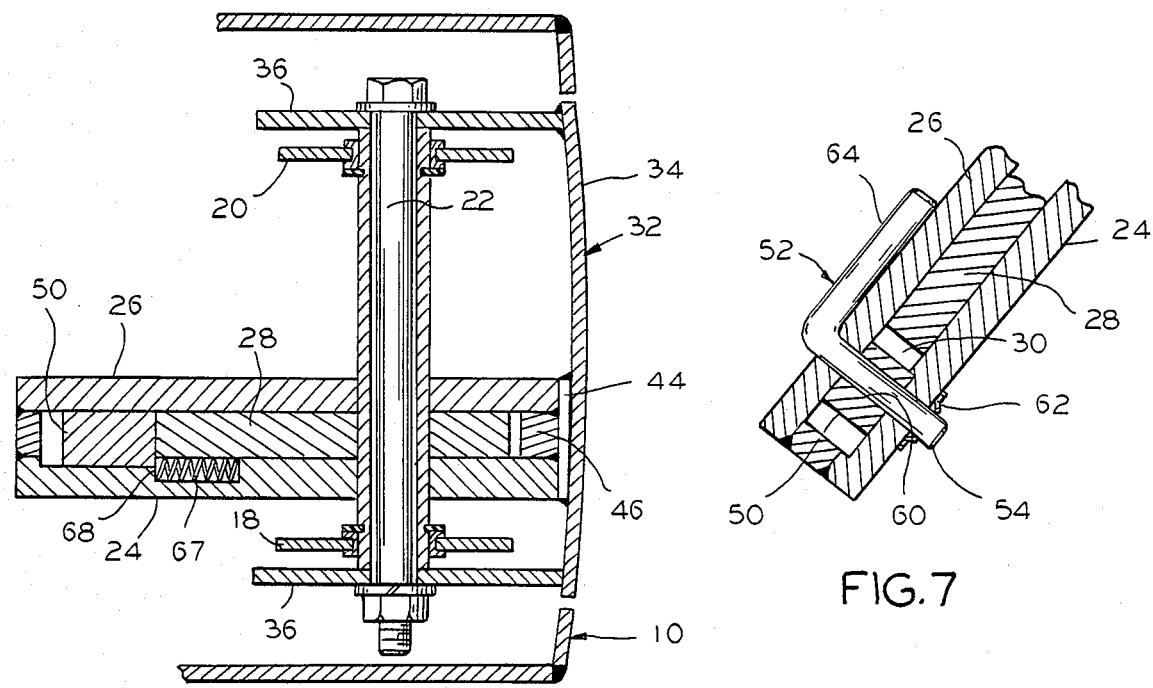
FIG. 6 is a partial cross-sectional view taken along the line 6—6 in FIG. 2 showing details of construction of the pull-to-release mechanism.

As shown in FIG. 2, the console 10 in general is mounted to the floor of a vehicle in well known manner. The pull-to-release mechanism 12 according to the invention is mounted beneath the console compartment 14 on a mounting member 16. The mounting member 16 is an upstanding rigid bracket-like member affixed to the body or other structural member of the vehicle or console frame. As shown in FIG. 6, affixed transversely between two legs 18, 20 of the mounting member is a pivot shaft 22 to which a second operating lever in the form of a pair of parallel, spaced apart secondary operating levers 24, 26 is affixed for pivotable movement. Encapsulated between the secondary operating levers 24, 26 is a stationary ratchet sector plate 28 which is affixed to the mounting bracket. The ratchet sector plate 28 is provided with ratchet sector teeth 30 along its free end. Also affixed for pivotable movement about the axis of the pivot shaft 22 is a primary operating lever 32 which includes an upstanding rear portion 34 and a generally horizontally extending lever arm 36 provided with a hand engageable member 38 on its free end. As shown in the drawings, the upstanding portion 34 of the primary lever arm 32 extends up to the top of the console 10 and has a console access cover 40 pivotably mounted thereto by way of a hinge 42. It can be seen that the access cover 40, with the primary lever 32 in the stored position, such as that according to FIGS. 1 and 2, covers the opening into the console compartment 14 and is itself pivotable to provide access into the compartment. Also, it can be seen that the access cover 40 pivots with the primary lever arm 32 as a unit about the shaft 22 between the stored position and brake-engaged position as shown in FIG. 3.

Figure 4:
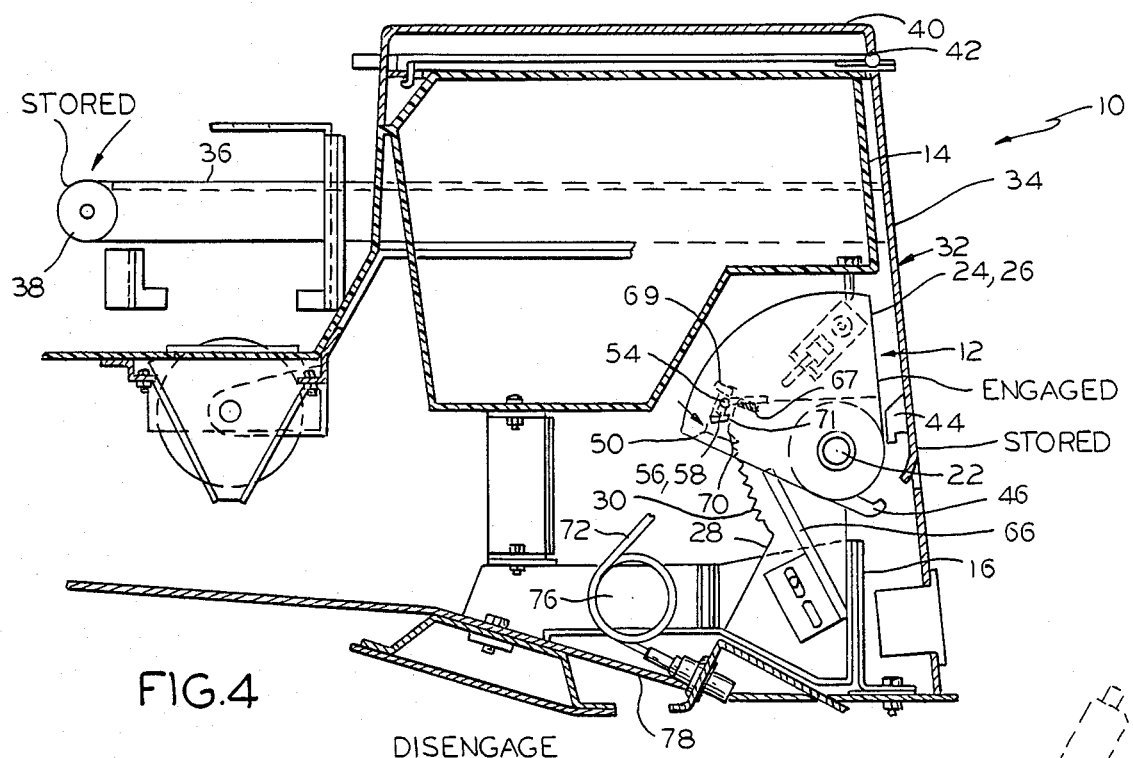
FIG. 4 is a vertical cross-sectional view of the console of FIG. 1 with the operating lever returned to the stored position with the pawl in the engaged position showing details of construction and operation.

The lower end of the upstanding portion 34 of the primary lever arm 32 is provided with a actuating pawl or abutment member 44 which engages a complimentary pawl or engagement member 46 provided on the secondary lever arms 24, 26. When the primary lever arm 32 is pivoted clockwise, as viewed in the drawings, from the stored position toward the set position, the abutment members 44, 46 engage together and the primary lever arm 32 causes the secondary lever arms 24, 26 to also pivot in a clockwise direction as viewed in the drawings toward an engaged position, as shown in FIG. 3. An important feature of the invention provides for independent pivotable movement of the primary lever arm 32 in a counter-clockwise direction, as viewed in the drawings, from the set position back to the stored position with the secondary lever arm retained in the engaged position by a pawl mechanism described below. It can be appreciated that, with the secondary lever retained in the engaged position, the primary lever is independently returnable to the stored position, as shown in FIG. 4.

Figure 8:
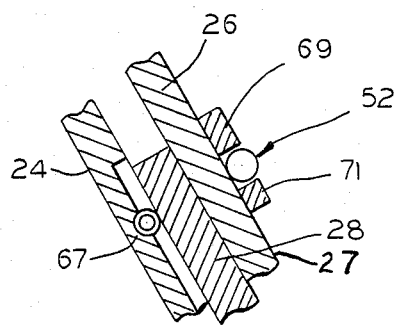
FIG. 8 is a partial cross-sectional view taken along the line 8—8 in FIG. 2 showing further details of construction.
Figure 9:
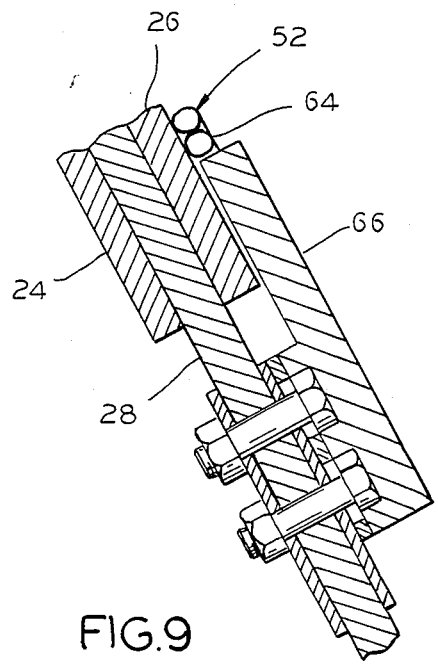
FIG. 9 is a partial cross-sectional view taken along the line 9—9 in FIG. 2 showing details of the reset arm.

The release mechanism 12 is a pull-to-release type including a pawl member 50 encapsulated between the two secondary levers 24, 26 and aligned with the ratchet sector 28. The pawl 50 is retained between the secondary lever arms 24, 26 by a pin member 52 having one pin portion 54 extending through aligned slots 56, 58 in the secondary levers 24, 26 and a hole 60 provided in the pawl member 50. The pin member 52 is axially retained by a retainer 62 on the end of the pin 54 as shown in FIG. 7. The pin member 52 is a bent rod having a second portion 64 extending in parallel relation to the secondary lever arms 24, 26 and, in the released position of the mechanism as shown in FIG. 2, the portion 64 is contacted by a stop member 66 which is affixed to either the mounting bracket 16 or stationary sector plate 28. As shown in FIGS. 2 and 8, two motion restraining members 69, 71 protrude outwardly and generally perpendicularly from the outer sidewall 27 of the secondary lever 26 at locations proximate the ends of the slot 58. The restraining members 69, 71 are positioned on opposite sides of the actuating stem 64 and as shown in FIGS. 2, 3, 4 and 5, the actuating stem, during operation, contacts one or the other of the restraining members 69, 71 and causes the pin member 52 to pivot about that restraining member so as to position the pin portion 54 and pawl 50 at one end or the other of the slots 56, 58 depending on the state of operation of the mechanism. The pin member 52 and the pawl 50 are thereby pivoted to the lower end, as viewed in FIG. 2, of the slots 56, 58 in the secondary lever arms. A compression spring 67 is provided in a recess 68 on an inner surface of one of the secondary lever arms, such as arm 24, and abuts against the underside of the pawl 50, as shown in FIG. 6. In the released position according to FIG. 2, the axis of compression of the compression spring 67 is offset from the pivotable axis of the pawl 50 about the pin 52 so as to place a counter-clockwise moment to the pawl, as shown by the arrow on the pawl 50, thereby biasing the pawl tooth 70 against the sector 28 towards the sector teeth 30.

The brake cable 72 is affixed to the secondary lever arms by way of a clevis assembly 74 and, in the embodiment shown, extends around a pulley 76, through the floor 78 of the vehicle and on to an emergency brake of the vehicle.

The operation of the actuator will now be described with reference primarily to FIGS. 2-5. As shown in FIG. 2, with the primary lever 32 in the stored position, the lever arm portion 36 surrounds the opening into the compartment 14 of the console 10 with the access cover 40 positioned over the opening. The secondary lever 24, 26 is biased by an initial tension in the cable 72 to the released position, that is, its extreme counter-clockwise position as shown in FIG. 2. In this position, the arm 64 of the pin member 52 is in contact with the stop member 66 and with restraining member 69. The member 52 is accordingly pivoted about the member 69 and the pin portion 54 and pawl 50 are accordingly positioned at the lower end of the slots 56, 58 in the secondary lever, as shown in FIG. 2. When the hand-brake is to be set, the primary lever arm 32 is pulled by the operator toward the set position as shown in FIG. 3 by pulling upward on the arm portion 36 by way of the hand engagable member 38. The primary lever 32 pivots about the shaft 22 and, as it does so, the abutment member 44 on the primary lever arm upstanding portion 34 contacts the corresponding abutment member 46 on the secondary lever arm 24, 26 thereby causing the secondary lever arm to pivot in a clockwise direction, as viewed in FIG. 3, about the axis of the shaft 22. As the secondary lever arm pivots, the counter-clockwise bias on the pawl by the compression spring 67 causes the pawl tooth 70 to ratchet across the ratchet sector teeth 30 on the stationary sector plate 28. When the cable 72 is tensioned and the operator releases the primary lever 32, the counter-clockwise bias on the pawl 50 causes the pawl to pivot about the pin 54 into engagement with the nearest tooth on the stationary sector plate 28. With the tooth so engaged, the secondary lever can rotate in a counter-clockwise direction only to the extent of the uppermost end of the slots 56, 58, as shown in FIG. 4. With the pin 54 and pawl 50 positioned in the uppermost end of the slot, the axis of compression of the spring 67 is shifted relative to the pin 54 and biases the pawl 50 in a clockwise direction. The secondary lever is held from pivotable movement because the pawl tooth 70 is engaged in the sector teeth 30 and the cable 72 is accordingly held in tension. It is to be noted that the restraining member 71 functions to maintain the arm 64 of the pin member 52 in a local region in line with the stop 66 during counter-clockwise return movement of the lever arm 24, 26 back to the release position. Because the primary lever 32 is mounted independently from the secondary lever 24, 26, it is pivotable back to the stored position from the set position with the secondary lever retained in the engaged position, as shown in FIG. 4.

Figure 5:
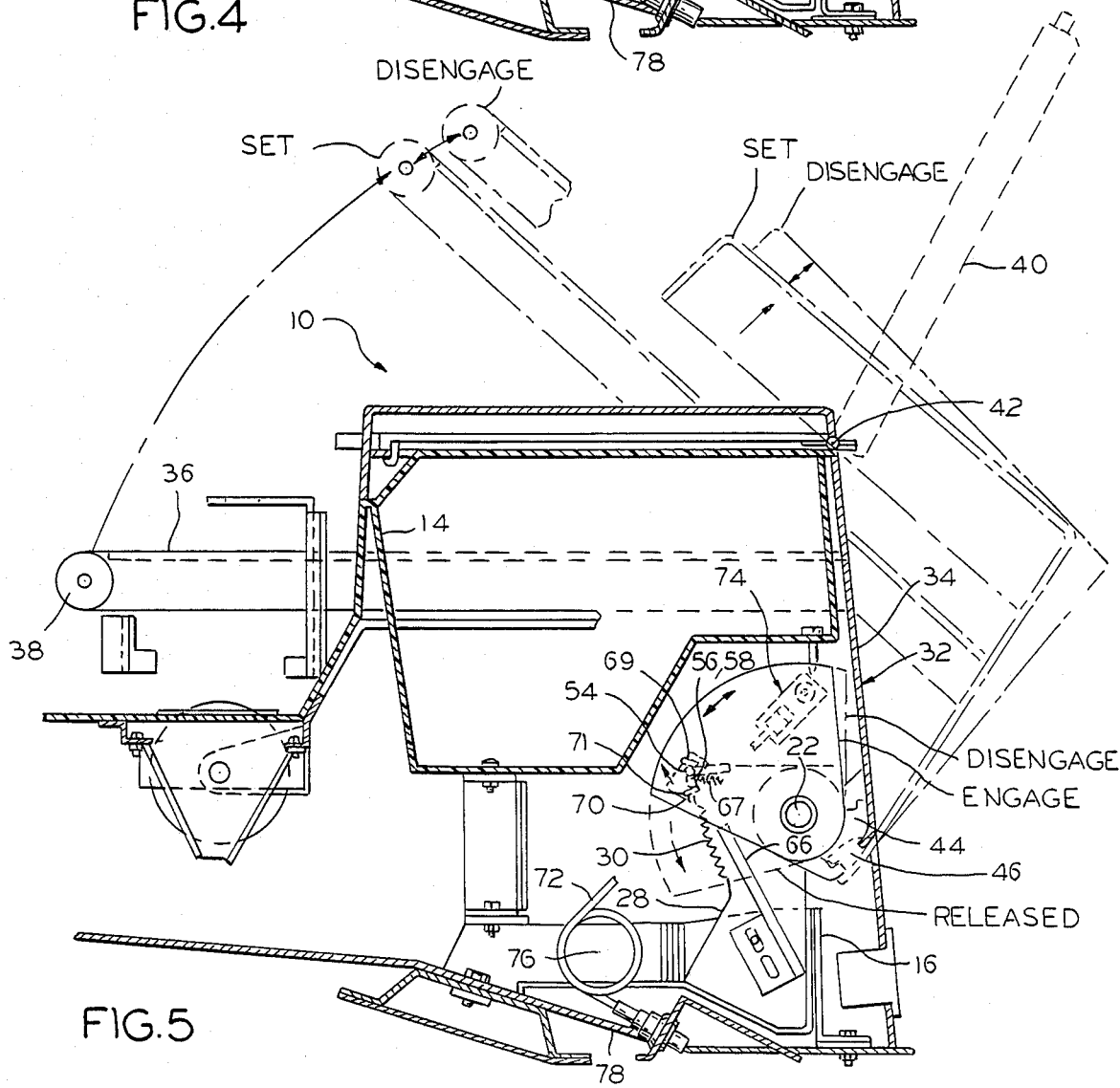
FIG. 5 is a vertical cross-sectional view of the console of FIG. 1 with the operating lever in the pull-to-release position showing details of construction and operation.

To release the tension on the cable, the primary lever 32 is again rotated in a clockwise direction, according to the drawings, so as to reengage the secondary lever as shown in FIG. 5. The primary lever is rotated an amount in excess of the set position so as to impose a force on the secondary lever 24, 26 slightly rotating it past the engaged position to a disengaged position. As the secondary lever and pawl is moved slightly past the engaged position, the clockwise moment imposed on the pawl by the compression spring 67 draws the pawl tooth 70 away from the sector teeth 30, as shown in FIG. 5. The clockwise moment on the pawl and clockwise movement of the secondary lever causes the pawl tooth to pivot out of engagement from the sector teeth. The primary lever arm is then returned to the stored position whereupon the tension in the cable pulls the secondary lever and the pawl back toward the released position of FIG. 2. As stated above, upon return to the release position, the actuating portion 64 of the pin member 52 contacts the stop 66 thereby pivoting the arm 64 about restraining member 69 forcing the pawl 50 and pin 54 to the lower end of the slot in the secondary lever and the mechanism is reset and ready for another engagement.

The configuration of the compartment 14 and the primary lever arm 32 shown are representative only and it is to be understood that other primary lever arm configurations can be devised. In any case, the primary lever arm defines a frame portion of the console preferably at the access opening and is adapted to receive the access cover. It should now be appreciated that the parking brake actuator for a vehicle in accordance with the principles of the present invention includes a first hand-engagable lever member 32 and a second lever or second lever member in the form of a pair of secondary operating levers 24, 26.

Having described the preferred embodiment of the invention those skilled in the art having the benefit of that description and the accompanying drawings can readily devise other modifications and embodiments and those other embodiments and modifications are to be considered to be within the scope of the appended claims.

What is claimed is:

1. A parking brake actuator for a vehicle, comprising:
a mounting member,
a stationary ratchet sector mounted to said mounting member including a plurality of ratchet sector teeth,
lever arm means pivotally mounted to said mounting member, said lever arm means including a first hand-engageable lever member pivotable between a stored position and a brake set position and a second lever member pivotable between a brake released position and said brake set position, said second lever member including means for attaching a brake cable thereto, said first lever member being pivotable from at least from the brake set position to the stored position independently of said second lever member, and
releasable pawl means associated with said second lever member of said lever arm means and with said ratchet sector teeth for holding said second lever member of said lever arm means in the brake set position, thereby to hold a brake cable in tension and said hand engageable first lever member of said lever arm means is pivotable to the stored position with said brake applied, said pawl means adapted to disengage from said ratchet sector teeth upon application of a force on said second lever member of said lever arm means by said first lever member in a direction past the brake set position.

2. The actuator mechanism as defined in claim 1 wherein said first hand-engagable lever member in the stored position defines a frame portion of a console of said vehicle, said frame portion of said console being disposed around an opening into a compartment of said console, and
a console cover is pivotably mounted to said first lever member said cover being disposed over said opening in the stored position.

3. A parking brake actuator, comprising:
a mounting member,
a first primary operating lever (32) mounted to said mounting member for pivotable movement between a stored position and a brake-set position,
a second lever mounted to said mounting member for pivotable movement between a brake-released position and said brake-engaged position, said second lever adapted to have a brake cable affixed thereto, said first primary lever member being mounted independently of said second lever, said first primary lever member adapted to engage said second lever in the brake-released position of said second lever and pivot said second lever from said brake released position to said brake engaged position said independent mounting of said first primary lever member providing for independent pivotable movement of said first primary lever member from the brake-set position of the first primary lever member to the stored position of said first primary lever member with said second lever retained in said brake engaged position,
a stationary ratchet sector including a plurality of ratchet sector teeth mounted on said mounting member,
a pawl on said second lever adapted to ratchet over said ratchet sector teeth during movement of said second lever from the brake released position to the brake-engaged position and to engage said teeth and retain said second lever in the brake-engaged position, and means associated with said pawl and with said second lever for releasing said pawl from engagement with said ratchet sector teeth upon application of a force on said second lever by said first primary lever member for moving said second lever past said brake-engaged position.

4. A parking brake actuator mechanism for a vehicle, comprising:

a mounting member adapted to be stationarily affixed to said vehicle, a primary operating lever (32) mounted to said mounting member for pivotable movement between a stored position and a brake-set position, said primary operating lever including a portion including a cover for a console compartment of said vehicle, said cover disposed over an opening into said compartment in the stored position of said first lever, a second lever mounted to said mounting member for pivotable movement between a brake-released position and said brake-engaged position, said second lever adapted to have a brake cable affixed thereto, said primary operating lever adapted to have a brake cable affixed thereto, said primary operating lever being mounted independently of said second lever about a common pivot access with said second lever and including an actuating arm portion disposed adjacent said second lever in the stored position of said primary operating lever and the released position of said second lever said actuating arm contacts said second lever and pivots said second lever from said release position to said engaged position upon movement of said primary operating lever from said stored position to said set position, said independent mounting of said primary operating lever providing for independent pivotable movement of said primary operating lever from said set position to said stored position with said second lever retained in said engaged position, a stationary plate-like member including a plurality of ratchet sector teeth said stationary member mounted on said mounting member, and a pawl pivotably mounted on said second lever adapted to traverse said ratchet sector teeth during movement of said second lever from said release position to said engaged position and to engage said ratchet sector teeth in the engaged position, whereby said second lever is retained against movement toward the released position and said cable is held in tension, and means associated with said pawl means and said second lever for releasing said pawl from engagement with said ratchet sector teeth upon application of a force by said primary operating lever to said second lever moving said second lever past said engaged position.

* * * * *